April 21, 1959 M. G. JÄENKE ET AL 2,883,456

CIRCUIT ARRANGEMENT FOR INTERCOMMUNICATION SYSTEMS

Filed March 31, 1954 2 Sheets-Sheet 1

INVENTORS,
MARTIN G. JÄNKE &
HELMÜT REISCHL
BY Robert Harding Jr.
ATTORNEY

April 21, 1959 M. G. JÄENKE ET AL 2,883,456

CIRCUIT ARRANGEMENT FOR INTERCOMMUNICATION SYSTEMS

Filed March 31, 1954 2 Sheets-Sheet 2

INVENTORS
MARTIN G. JÄNKE &
HELMÜT REISCHL
BY Robert Harding Jr.
ATTORNEY

United States Patent Office 2,883,456

Patented Apr. 21, 1959

2,883,456

CIRCUIT ARRANGEMENT FOR INTERCOMMUNICATION SYSTEMS

Martin G. Jaenke, Alamogordo, N. Mex., and Helmüt Reischl, Stuttgart-Zuffenhausen, Germany, assignors to International Standard Electric Corporation, New York, N.Y., a corporation of Delaware Application March 31, 1954, Serial No. 420,119

Claims priority, application Germany April 29, 1953

11 Claims. (Cl. 179—1)

In intercommunication systems, in which electro-acoustic transducers serve as microphones as well as telephones or loudspeakers respectively, it is necessary, on account of the existence of one or more amplifiers, to perform switching according to the desired speaking direction. These switching operations can be released, for instance, either by means of push-button keys, or by a switching command derived from the voice frequency. The electro-acoustic transducer will be connected either to the input or the outlet of the amplifier.

In the conventional types of such systems the switching operations were performed by means of contacts arranged in the leads leading to the converter. This arrangement, however, admits of the possibility of producing scratching noises from improperly made contacts. Furthermore these arrangements have the disadvantage of creating an open input and an unloaded output for the amplifier during the time required for the switching operations. This disadvantage could not be overcome by the employment of two-way make-before-break contacts (sequence contacts), because by such use necessarily the input and the outlet of the amplifier would be connected with each other for a short time and that, consequently, the amplifier would oscillate because of self-excitation.

Further, there exist difficulties in systems in which the switching over of the speaking direction is performed by a command signal remote from the amplifier and near the speaking station. The input and outlet leads of the amplifier, in this case, have to be led to the switching point whereby, due to unfavourable capacitative coupling between the leads, the amplifier is energized automatically. In order to avoid such undesirable coupling, the system will require the installation of shielded leads which, of course, will increase the initial costs of such a system.

This invention likewise relates to a circuit arrangement for intercommunication systems of the kind in which the switching operations for changing over to the respective speaking direction is performed by a switching command which is either arbitrarily generated or derived from the voice frequency, and which does not exhibit the aforesaid disadvantages. This is achieved in that the preparation (speaking, listening) of the electro-acoustic transducer (microphone-loudspeaker) of a station in an incoming or outgoing direction is performed by means of a de-coupling circuit in such a way by the contact devices which are actuated by the switching command signal, that the undesired direction will be short-circuited each time in the de-coupling circuit.

According to another feature of the invention the contact devices which are actuated by the switching command, are designed to short-circuit both of the speaking directions during the pendency of the switching-over operation.

According to another feature of the invention there is provided an amplifier between two stations in each speaking direction, the efficiency of this amplifier being made dependent upon the contact devices of a fork connection.

When providing only one common amplifier for both of the speaking directions, then the input and the output of this amplifier, according to the further feature of the invention, must be separated into two inputs and outputs which are decoupled from each other. These split-up inputs and outputs will then be connected with the inputs and outputs of the decoupling circuits associated with the respective stations.

The said splitting-up of the input and output of the amplifier into two inputs and outputs decoupled from each other, may be performed, as is provided by the invention, by means of electronic switching means, preferably by the employment of double tubes for serving as the input and output tubes of the amplifier.

A more thorough understanding of the present invention, may be had from the following detailed description and the accompanying drawings in which.

Figure 1:
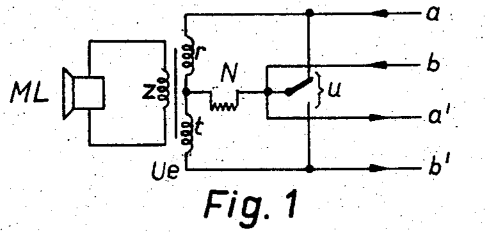
Fig. 1 shows a fork connection serving as the decoupling circuit of one station.

Referring now to Fig. 1 of the drawings, there is shown a combination microphone-loudspeaker ML coupled to the winding $z$ of a combination input-output transformer $Ue$. The transformer $Ue$ has two windings $r$ and $t$ each of which are mutually coupled to the winding $z$. Two separate sets of wire pairs, $a$, $b$ and $a'$, $b'$ are adapted to be connected to the windings $r$ and $t$, respectively through their decoupling network N. Double throw contact $u$ is adapted to selectively short-ciruit either of said wire pairs. As shown in the drawings, the contact $u$ effectively shunts the incoming wire pair $a$, $b$ and the winding $r$. Thus a transmission path is established from the microphone-loudspeaker ML via windings $z$ and $t$ of the coupling transformer $Ue$ and the decoupling network N to the outgoing wire pairs $a'$, $b'$.

Figure 2:
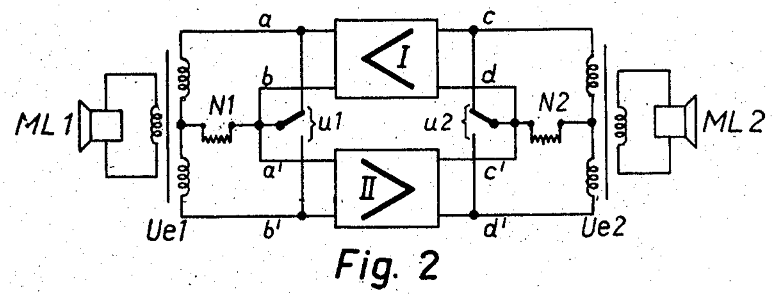
Fig. 2 shows an intercommunication system of the kind in which amplifiers are provided in both speaking directions.

Fig. 2 shows a two station arrangement each having identical components and each having its individual amplifier. Thus, amplifier I is adapted to receive its input output to the michophone-loud-loudspeaker ML2 and the from microphone-loudspeaker ML2 and to deliver its output to the microphone-loudspeaker ML1. Amplifier II is correspondingly adapted to receive its input from microphone-loudspeaker ML1 and to deliver its output to microphone-loudspeaker ML2. It will be noted that each station is provided with a shunting contact U1 or U2. As shown in the drawings, the input of amplifier I is shunted by contact U2 and the output of the amplifier I is effectively shunted by contact U1. This position prevents microphone-loudspeaker ML2 from transmitting, but microphone-loudspeaker ML1 is in condition to transmit into the input of amplifier 2 and microphone-loudspeaker ML2 is adapted to have its coupling transformer connected to the output of amplifier 2.

Figure 3:
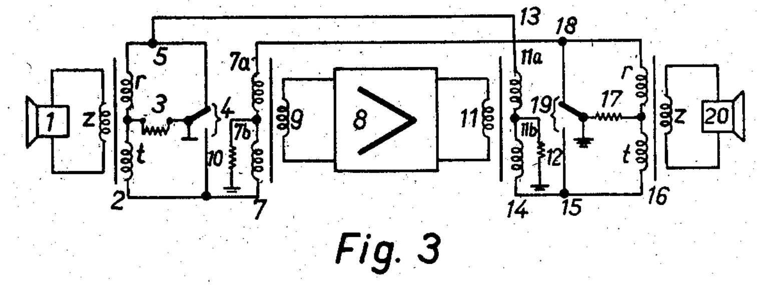
Fig. 3 shows an intercommunication system employing one amplifier only.

Fig. 3 discloses a system for two stations employing but a single amplifier, 8. Each station as in the previous embodiment is equipped with its individual input-output coupling transformer 2, 16, balancing networks 3, 17 and double-throw contacts 4, 19 respectively. The amplifier 8 is provided with a separate input transformer 7 having a single secondary 9 and a split primary 7$a$ and 7$b$ and a balancing network 10 extending from the center of said primary to ground. The amplifier 8 is also provided with an output transformer 14 having a single primary 11 and a split secondary having windings 11*a* and 11*b*. A decoupling network 12 is connected to the center point of said secondary windings. As shown in the drawings the output winding 11*a* feeds the output of amplifier 8 between ground and conductor 13 to winding *r* of the coupling transformer 2. Contact 4, however, effectively shunts winding *r* and therefore the output of the amplifier can not be received over microphone-loudspeaker 1. It will be observed that secondary winding 11*b* is connected via conductor 15 to winding *r* of transformer 16 which is associated with microphone-loudspeaker 20 and the output of the amplifier will energize speaker 20. Microphone-loudspeaker 1 is coupled by means of winding *t* of the coupling transformer 2 to the primary winding 7*b* of the input coupling transformer to the amplifier 8. Thus, a transmission path is established from microphone-loudspeaker 1 to microphone-loudspeaker 20. Transfer of the contacts 4 and 19 will cause an opposite result, that is microphone-loudspeaker 20 will be capable of transmitting and microphone-loudspeaker 1 will be capable of receiving.

Figure 4:
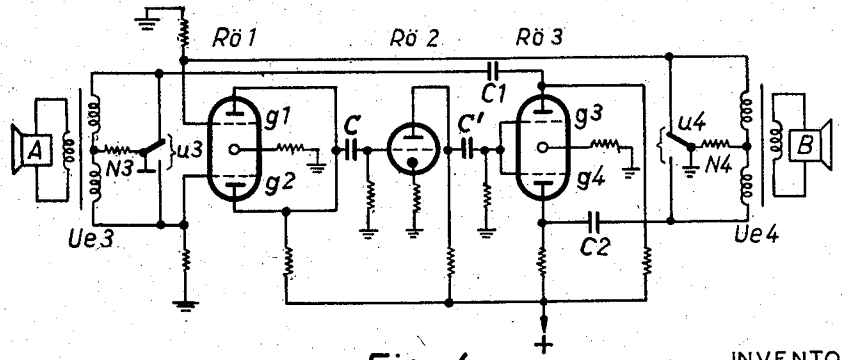
Fig. 4 shows an intercommunication system employing one amplifier and in which the decoupling is performed by means of double tubes.

In the embodiment just described, the amplifier input and output is split by the employment of a transformer and a corresponding balancing network to achieve decoupling. In Fig. 4 an embodiment is shown which permits the splitting of the amplifier input and output by electron tubes in lieu of amplifier input and output transformers respectively. In the embodiment, we provided a pair of double triodes R*o*1, R*o*3. The stations are provided with similar coupling transformers U*e*3 and U*e*4 respectively and in the position shown the output of microphone-loudspeaker A is fed into the grid *g*2 of the tube R*o*1. The anode of tube R*o*1 which is associated with grid *g*2 is capacitatively coupled to amplifier tube R*o*2 by means of capacitor C which couples the anode circuit of tube R*o*1 to the grid circuit of tube R*o*2. The output of the anode circuit of tube R*o*2 is capacitatively coupled by means of condenser C' to both grids *g*3 and *g*4 of tube R*o*3. The method of coupling is a well known resistance-capacity type coupling. The amplifier signals will therefore appear at both anodes of tube R*o*3 and will be fed via condenser C2 to the lower primary winding of transformer U*e*4 to microphone-loudspeaker B. The output from the upper anode of tube R*o*3 which is fed via condenser C1 to the upper winding of coupling transformer U*e*3 is shunted to ground via contact U3. Thus, again, microphone-loudspeaker A may transmit and microphone-loudspeaker B may receive. If the situation is to be reversed, that is microphone-loudspeaker B is to transmit and microphone-loudspeaker A is to receive, the contacts U3 and U4 will be moved to their reversed position and thereby grid *g*1 of tube R*o*1 will be fed an input from the upper winding of coupling transformer U*e*4 and the condenser C1 coupled to the top anode of tube R*o*3 will now couple the upper winding of transformer U*e*3 to the amplifier output.

Figure 5:
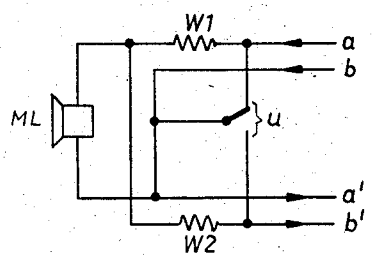
Fig. 5 shows a decoupling circuit with its resistors.

In Fig. 5 there is shown a decoupling circuit corresponding to the circuit shown in Fig. 1, and in which the decoupling of the incoming and outgoing directions is performed by means of resistors W1 and W2. Thus, the coupling transformer U*e* may be dispensed with in the Figure 5 showing. As shown in Fig. 5 the contact U short circuits the interconnecting wire pair *a*, *b* whereas a circuit from microphone-loudspeaker ML is completed via resistor W2 to wire *b'* and a direct connection between microphone-loudspeaker ML to wire *a'* is shown. Therefore, microphone-loudspeaker ML may transmit and if it is desired to receive thereover double-throw contact *u* will shunt the pair *a'*, *b'* and the pair *a*, *b* will now feed incoming signals to microphone-loudspeaker ML.

Figure 6:
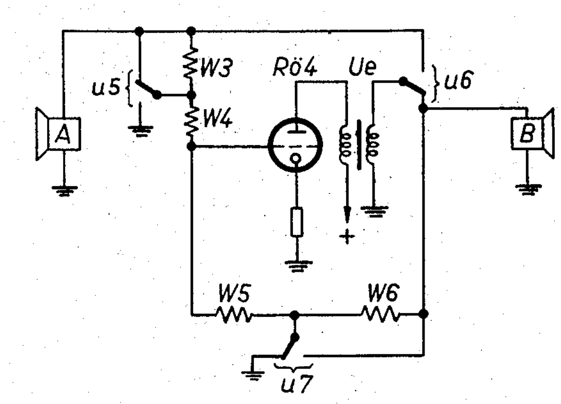
Fig. 6 shows a decoupling circuit with resistors and one amplifier.

In Fig. 6 another embodiment of the invention is shown incorporating two stations having microphone-loudspeakers A and B, decoupling networks W3, W4, W5, W6 and double-throw contacts *u*5 and *u*7, respectively. A single output transformer U*e* is coupled to the amplifier R*o*4, provided with an auxiliary contact *u*6 adapted to selectively couple microphone-loudspeaker A or B to the output of said tube. As shown in the drawings, contact *u*5 connects the output of microphone-loudspeaker A via resistance W4 to the grid of tube R*o*4. Contact *u*7 on the other hand effectively shunts to ground any output from the microphone-loudspeaker B. The only series contact in the path of the speech current will be contact *u*6 but since *u*6 controls a substantial amount of power, contact noise will be insignificant. The resistors W3—W6 are of such a value as to prevent substantial attenuation of the output of the amplifier R*o*4 caused by the positioning of contact *u*5 or *u*7 in the grounded position.

What is claimed is:

1. An electrical circuit for an intercommunication system comprising a pair of stations, a pair of unidirectional transmission paths interconnecting said stations, each station comprising: a common transducer, a pair of energy-transfer networks, each network coupling said transducer to a different one of said paths, decoupling means common to said paths and said networks, switch means operatively coupled to said decoupling means and said networks for selectively shunting one of said networks to render same inoperative, said decoupling means adapted to maintain each of said paths decoupled from said networks while said switch means shifts from one shunting condition to the other.

2. A circuit arrangement as claimed in claim 1, wherein said energy-transfer network comprises a coupling transformer having three windings, a first of said windings connected to said transducer, and said second and third windings connected to said paths, respectively.

3. A circuit arrangement as claimed in claim 1, wherein said energy-transfer networks comprises a separate resistance coupling each path to one terminal of its associated transducer.

4. A circuit arrangement as claimed in claim 1, wherein said switch means comprises a pair of double throw contacts, each associated with a different one of said networks.

5. A circuit arrangement as claimed in claim 1, wherein each of said paths further comprise an amplifier having an input and an output, the input and output of each of said amplifiers coupled to different ones of said transducers.

6. A circuit arrangement as claimed in claim 5, wherein each of said paths further comprise a pair of double-throw contacts, one of said contacts adapted to selectively shunt the output of one of said amplifiers and the other of said contacts adapted to selectively shunt the input of one of said amplifiers, said contacts adapted to be operated in tandem.

7. A circuit arrangement as claimed in claim 1, wherein said paths comprise a single amplifier having an input and an output, an additional pair of energy-transfer networks coupled to said input and output respectively, said decoupling circuit including means for selectively coupling said additional networks to alternate of said transducers.

8. A circuit arrangement as claimed in claim 1, wherein said paths comprise a plurality of amplifier means, each of said means having an input and an output, each of said transducers coupled to a different one of said inputs and outputs, respectively, said switch means adapted to selectively shunt said inputs.

9. A circuit arrangement as claimed in claim 1, wherein said paths comprise a single amplifier having an input and an output, the energy-transfer network at each station in shunt with said input and means for coupling the output of said amplifer to given of said transducers.

10. A circuit arrangement as claimed in claim 9, wherein said means for coupling the output of said amplifier to said transducers comprises a further network coupled between the output of said amplifier and each of said transducers.

11. A circuit arrangement as claimed in claim 10, wherein said further network is coupled to the energy-transfer networks of each station and includes an impedance having a value sufficient to attenuate the microphone output of said transducers while said switch means shifts from one shunting condition to the other.

References Cited in the file of this patent

UNITED STATES PATENTS

| | | |
|---|---|---|
| 2,236,645 | Levy | Apr. 1, 1941 |
| 2,267,622 | Mitchell | Dec. 23, 1941 |
| 2,424,069 | Tschumi | July 15, 1947 |
| 2,460,475 | Tschumi | Feb. 1, 1949 |
| 2,477,275 | Tschumi | July 26, 1949 |
| 2,545,476 | Levy | Mar. 20, 1951 |
| 2,545,477 | Levy | Mar. 20, 1951 |
| 2,545,478 | Levy | Mar. 20, 1951 |